US008612085B2

(12) United States Patent
Flohr et al.

(10) Patent No.: US 8,612,085 B2
(45) Date of Patent: Dec. 17, 2013

(54) AUTONOMOUS NAVIGATION SYSTEM AND METHOD FOR A MANEUVERABLE PLATFORM

(75) Inventors: Myriam Flohr, Even Yehuda (IL); Gilad Steiner, Herzelia (IL); Inon Ben Zur, Ein Ayalla (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 13/142,458

(22) PCT Filed: Dec. 28, 2009

(86) PCT No.: PCT/IL2009/001220
§ 371 (c)(1),
(2), (4) Date: Aug. 2, 2011

(87) PCT Pub. No.: WO2010/076787
PCT Pub. Date: Jul. 8, 2010

(65) Prior Publication Data
US 2011/0288714 A1 Nov. 24, 2011

(30) Foreign Application Priority Data
Dec. 30, 2008 (IL) .......................................... 196276

(51) Int. Cl.
*G01C 22/00* (2006.01)

(52) U.S. Cl.
USPC .......................................................... 701/27

(58) Field of Classification Search
USPC .................................................... 701/23, 27
See application file for complete search history.

(56) References Cited

U.S. PATENT DOCUMENTS 7,139,741 B1 11/2006 Benjamin
7,865,277 B1 * 1/2011 Larson et al. .................... 701/23

(Continued)

FOREIGN PATENT DOCUMENTS

EP 0936517 A2 8/1999

OTHER PUBLICATIONS

International Search Report issued for PCT/IL2009/001220 on Apr. 7, 2011.
Interval Programming: A Multi-Objective Optimization Model for Autonomous Vehicle Control; Michael R. Benjamin, Doctoral thesis, Brown University, 2002.

(Continued)

*Primary Examiner* — James Trammell
*Assistant Examiner* — Michael D Lang
(74) *Attorney, Agent, or Firm* — Pearl Cohen Zedek Latzer Baratz, LLP

(57) ABSTRACT

An automated method for autonomous navigation of a maneuverable platform is disclosed. The method includes providing an autonomous navigation system that includes a situation awareness module to receive data from one or more sensors on one or more identifying parameters selected from the group of identifying parameters that includes position, course and speed, relating to the platform and obstacles in the vicinity of the platform. The platform also includes a decision module to choose course and speed for the platform based on the identifying parameters of the obstacles in the vicinity of the platform and the data on the position of the platform. The method further includes providing the decision module with information on a mission that includes at least one task assigned to the platform; and periodically obtaining the data and choosing a preferred option using the decision module, based on the identifying parameters, by assigning, for each option from a set of options, each option defining a distinct combination of course and speed, a grade which is indicative of the desirability of that option with respect to each of the obstacles and with respect to each of a plurality of objectives, for each option summing the grades assigned to that option with respect to all obstacles, wherein the preferred option is the option whose summed grades is indicative of the greatest desirability of that option.

10 Claims, 6 Drawing Sheets

(56) References Cited

U.S. PATENT DOCUMENTS

| | | | |
|---|---|---|---|
| 7,957,858 B1* | 6/2011 | Larson et al. | 701/23 |
| 2004/0193374 A1* | 9/2004 | Hac et al. | 701/301 |
| 2008/0195293 A1 | 8/2008 | Norris | |
| 2009/0210109 A1* | 8/2009 | Ravenscroft | 701/26 |

OTHER PUBLICATIONS

Navigation of Unnamed Marine Vehicles in Accordance with the Rules of the Road; Benjamin et al., May 2006.

* cited by examiner

AUTONOMOUS NAVIGATION SYSTEM AND METHOD FOR A MANEUVERABLE PLATFORM

FIELD OF THE INVENTION

The present invention relates to navigation. More particularly, the present invention relates to an autonomous navigation system and method for a maneuverable platform.

BACKGROUND OF THE INVENTION

The use of unmanned platforms is advantageous in many situations, both military and civilian. In order for such a platform to be truly useful, it is desirable to offer the platform autonomous navigational capability, as otherwise, continuous communication between a remote operator and the platform would be required. Without continuous control or autonomous navigation capability, the platform may collide with obstacles that were not previously known, endangering both the platform and others in the vicinity. A maneuverable platform may be assigned a mission that includes one or more tasks that it is to accomplish. Such tasks may include, for example, traveling to a defined location, or waypoint, and performing a defined activity at the location, or be a loosely defined task such as to patrol an area. The route traveled must be selected such as to avoid obstacles and restricted zones. Such obstacles may be fixed, or may be moving. Since the positions of moving obstacles, such as other platforms, may be constantly changing, an autonomous platform should preferably be capable of detecting such obstacles, estimating their anticipated routes, and maneuvering in such a manner as to avoid a collision. Therefore, in order to complete a task in the absence of continuous guidance from a human operator, a platform should preferably be able to perform autonomously such functions as navigation, conforming to a timetable, selecting a route to avoid known fixed obstacles or other forbidden areas, detecting the locations and courses of obstacles and other platforms, and conforming to defined rules such as traffic regulations.

In particular, such considerations apply to an unmanned surface vehicle (USV) operating at sea, or an unmanned aerial vehicle (UAV). For the sake of brevity a USV is considered, but this should not be regarded as limiting the scope of the present invention. A USV, in order to prevent collisions with other surface craft, should preferably be able to detect obstacles and other vessels, determine the speed and course of other vessels, and adjust its own motion (course and speed) in order to avoid a collision. In maneuvering to avoid a collision, a seagoing USV should preferably also conform to the International Regulations for Preventing Collisions at Sea (COLREGS). COLREGS determine the proper action to avoid collision when seagoing vessels encounter one another. COLREGS determine, depending on the types of the encountering vessels and the activities in which the vessels are engaged, among other considerations, how each vessel is expected to maneuver in order to avoid a collision. However, under some circumstances, COLREGS may be ambiguous. For example when more than two vessels are involved, several regulations may apply simultaneously, each prescribing a different, sometimes contradicting, action. In such situations, a vessel operator is expected to employ judgment and common sense in implementing COLREGS so as to best avoid a collision. For this reason, COLREGS are difficult to assimilate in programming for an autonomous USV.

Michael R. Benjamin ("Interval Programming: A Multi-Objective Optimization Model for Autonomous Vehicle Control", Doctoral thesis, Brown University, 2002) describes a method for autonomously controlling a vehicle using piecewise-defined interval programming (IvP) behavior functions. The IvP functions are piecewise defined such that each point in the decision space is covered by one and only one piece, and each piece is an interval programming piece. The decision variables might be, for example, course and speed. The behavior functions are typically an approximation of a behavior's true underlying utility function. According to the multi-objective optimization method described in U.S. Pat. No. 7,139,741 (Benjamin), an IvP function is set up for each individual behavior of the vehicle in each step. For example, when the COLREGS rules are considered, an IvP function will be defined for each rule in each step. About 600 linear pieces are used to represent the waypoint behavior (reaching a waypoint) ("Navigation of Unmanned Marine Vehicles in Accordance with the Rules of The Road", Benjamin et al, May 2006). The interval programming problem consists of a set of k piecewise-defined objective functions. Each objective function (1 . . . k), defined over n decision variables has an associated weight. A solution to the interval programming problem is the single decision with the highest value, when evaluated by $w_1 \times f_1(x_1, \ldots x_n) + \ldots w_k \times f_k(x_1, \ldots x_n)$. Typically, adding the weighted piecewise functions will not create another piecewise defined function because the pieces of all IvP functions do not overlap. The intersection is done using the upper and lower bounds of each dimension of the pieces, such that a new piece is formed at the intersection of the two pieces. The combinations of the objectives can be represented in a tree, with k+1 layers, where k is the number of the objective functions. Each layer 1 (1=2, . . . , k+1) in the tree represents all possible pieces of the objective 1-1 for each piece at the parent layer. If, for example, we have 5 objectives with 600 pieces each, the tree will hold $600^5 + 1$ nodes. There are many possible algorithms to search through the tree. One known algorithm is "Branch and Bound". In U.S. Pat. No. 7,139,741 by Benjamin, Michael R. a method using grid structures is taught. As the IvP function should be formulated in regard to each obstacle and due to the plurality and numerousness of constraints, in a real world navigation problems, the proposed method may become unwieldy.

Other groups have described methods for autonomous navigation of a land vehicle, where the motion of vehicles is limited to predetermined roads or courses. Such methods plot out an optimum course in advance, making adjustments in response to obstacles. Such methods are not suitable for navigation in such situations as on the open sea, where vehicles may be free to travel in almost any direction.

It is an object of the present invention to provide an effective and flexible autonomous navigation system and method for a maneuverable unmanned platform that enables the platform to accomplish a mission while avoiding collisions or too close encounters with obstacles and abiding traffic regulations.

Other aims and advantages of the present invention will become apparent after reading the present invention and reviewing the accompanying drawings.

SUMMARY OF THE INVENTION

There is thus provided, in accordance with some embodiments of the present invention, an automated method for autonomous navigation of a maneuverable platform the method comprising:

providing an autonomous navigation system that includes:
a situation awareness module that receives data from one or more sensors on one or more identifying parameters selected from the group of identifying parameters that includes position, course and speed, relating to the platform and obstacles in the vicinity of the platform;

a decision module for choosing course and speed for the platform based on said one or more identifying parameters of the obstacles in the vicinity of the platform and the data on the position of the platform;

providing the decision module with information on a mission that includes at least one task assigned to the platform; and periodically obtaining the data and choosing a preferred option using the decision module, based on the identifying parameters, by assigning, for each option from a set of options, each option defining a distinct combination of course and speed, a grade which is indicative of the desirability of that option with respect to each of the obstacles and with respect to each of a plurality of objectives, for each option summing the grades assigned to that option with respect to all obstacles, wherein the preferred option is the option whose summed grades is indicative of the greatest desirability of that option.

Furthermore, in accordance with embodiments of the present invention, the method further includes providing a platform control module for maneuvering the platform and commanding drive controls of the platform to apply the course and speed of the preferred option for the platform.

Furthermore, in accordance with embodiments of the present invention, the method further includes planning said at least one task.

Furthermore, in accordance with embodiments of the present invention, the method further includes planning a mission plan for the mission.

Furthermore, in accordance with embodiments of the present invention, the step of choosing a preferred option includes determining whether said at least one task can not be accomplished according to plan before choosing the preferred option.

Furthermore, in accordance with embodiments of the present invention, the step of determining whether said at least one task can not be accomplished according to plan includes, for each obstacle, calculating projected positions of the platform and of that obstacle to determine the distance between the platform and the obstacle at the closest point of approach and estimated time to arrive to the closest point of approach, and determining, with respect to an early reaction time and an avoidance distance suitable for that obstacle and the platform, whether that distance is smaller or greater than the avoidance distance.

Furthermore, in accordance with embodiments of the present invention, the method includes assigning a weight to each of the objectives indicative of importance attributed to that objective, and in the step of choosing the preferred option, taking into account the weights assigned to the objectives.

Furthermore, in accordance with embodiments of the present invention, the step of assigning a weight to each of the objectives is carried out using an input device.

Furthermore, in accordance with embodiments of the present invention, the objectives are selected from a group of objectives including: conforming to traffic rules, avoiding collisions with other obstacles, maintaining a speed within a predefined range, avoiding substantial speed changes, avoiding substantial course changes, making a noticeable course change, performing the task according to plan and fulfilling the task.

Furthermore, in accordance with embodiments of the present invention, the platform is selected from a group of platforms that includes: manned or unmanned aerial, ground and maritime platforms.

Furthermore, in accordance with embodiments of the present invention, the method includes choosing an option that is not the preferred option.

Furthermore, in accordance with embodiments of the present invention, there is provided a computer program comprising computer program code means adapted to perform the method steps when said program is run on a computer.

Furthermore, in accordance with embodiments of the present invention, there is provided a computer readable medium containing computer executable instructions, that when executed on a computer perform steps of the abovementioned method.

Furthermore, in accordance with embodiments of the present invention, there is provided an autonomous navigation system for maneuvering a maneuverable platform the system comprising:

a situation awareness module that receives data from one or more sensors on one or more identifying parameters selected from the group of identifying parameters that includes position, course and speed, relating to the platform and obstacles in the vicinity of the platform; and a decision module for choosing course and speed for the platform based on said one or more identifying parameters of the obstacles in the vicinity of the platform and the data on the position of the platform, the decision module adapted to periodically obtain the data and determine a preferred option, based on the identifying parameters, by assigning, for each option from a set of options, each option defining a distinct combination of course and speed, a grade which is indicative of the desirability of that option with respect to each of the obstacles and with respect to each of a plurality of objectives, for each option summing the grades assigned to that option with respect to all obstacles, wherein the preferred option is the option whose summed grades is indicative of the greatest desirability of that option.

Furthermore, in accordance with embodiments of the present invention, the system further includes a platform control module for maneuvering the platform by commanding drive controls of the platform to apply the course and speed of the preferred option for the platform.

Furthermore, in accordance with embodiments of the present invention, the decision module is designed to calculate projected positions of the platform and of that obstacle to determine the distance between the platform and the obstacle at the closest point of approach and estimated time to arrive to the closest point of approach, and determining, with respect to an early reaction time and an avoidance distance suitable for that obstacle and the platform, whether that distance is smaller or greater than the avoidance distance.

Furthermore, in accordance with embodiments of the present invention, the decision module is adapted to take into account a weight assigned to each of the objectives indicative of importance attributed to that objective, when choosing the preferred option.

Furthermore, in accordance with embodiments of the present invention, an input device is provided onboard the platform.

Furthermore, in accordance with embodiments of the present invention, the environment sensors are selected from a group of sensors including: radar, external command and control system, electro-optic payload and automatic identification system (AIS).

Furthermore, in accordance with embodiments of the present invention, the navigation sensors are selected from a group of sensors including: global positioning system (GPS) receiver, inertial measurement unit (IMU), Gyro, accelerometers, 6dof sensors, compass, and speed indicator.

Furthermore, in accordance with embodiments of the present invention, the system is further provided with means for providing information on the chosen option to a human operator.

Furthermore, in accordance with embodiments of the present invention, the means for providing the information include at least one of a display, a speaker and a printer.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF EMBODIMENTS

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

A system and a method for autonomous navigation of a maneuverable platform in accordance with embodiments of the present invention are hereby disclosed, aimed at allowing the platform to accomplish a predetermined mission.

An autonomous navigation system of a maneuverable platform is assigned a mission, which the platform is to accomplish and which, in the context of the present invention, is comprised of several tasks. A mission may include tasks such as, for example, reaching certain waypoints, patrolling a designated sector, and following or approaching an object or objects. A mission may also include other tasks. Typically the tasks are to be performed consecutively.

The maneuverable platform may be, for example, an unmanned vehicle or a manned maneuverable vehicle (for example, a vehicle) operating in an autopilot mode during which the vehicle travels autonomously of a human operator that is aboard the vehicle. Alternatively, the autonomous navigation system of the maneuverable platform may act as a Decision Support System (DSS) for a manned, or remotely controlled, platform, assisting the human operator in making navigational decisions under circumstances where many different factors must be taken into account. In the context of the present invention "platform" refers to any platform which is manned or unmanned, aerial, ground or maritime (such as, for example, a boat or a submarine).

Figure 1:
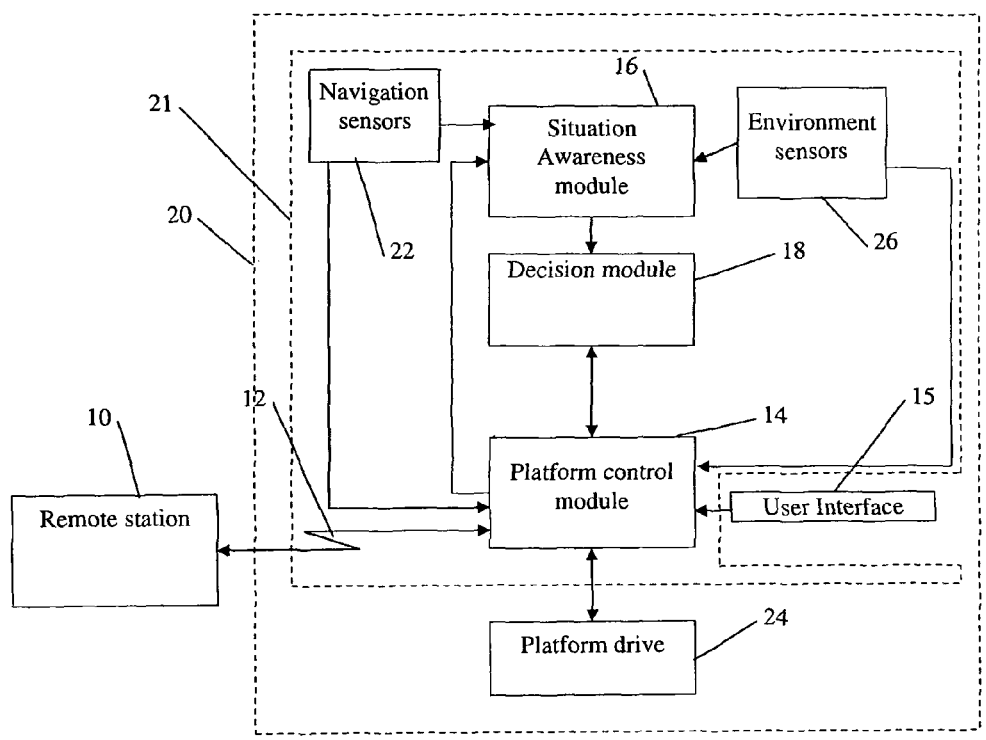
FIG. 1 is a block diagram of an autonomous navigation system for a maneuverable platform in accordance with embodiments of the present invention.

Reference is now made to FIG. 1, illustrating a block diagram of an autonomous navigation system for a maneuverable platform in accordance with embodiments of the present invention.

Maneuverable platform 20, for example a sea-going USV, is equipped with autonomous navigation system 21, which controls the steering and speed of maneuverable platform 20.

Instructions defining a mission for autonomous navigation system 20 may be provided before the mission commences.

Autonomous navigation system 21 may include one or more computer processors. Autonomous navigation system 21 may be divided into several functional modules. The functional modules may be, for example, separate computer hardware components, or separate software functions that share the same hardware components.

Platform control module 14 may receive instructions which are input directly or communicated from remote station 10. The instructions may define the mission of the maneuverable platform and constraints on the maneuver of the maneuverable platform.

Platform control module 14 may communicate instructions to platform drive 24. Platform drive 24 can change or maintain the course and speed of the maneuverable platform. For example, when the maneuverable platform is a seagoing USV, platform drive 24 may include steering and throttle control.

The instructions that platform control module 14 communicates to platform drive 24 may depend on input from Decision module 18 or may depend on inputs from the environment sensors 26 or platform drive 24. The task of Decision module 18 is to select the preferable combination of course and speed at any given time. Selection of a preferable course-speed combination is based on mission information from platform control module 14, information (hereinafter referred to as—Situation Awareness) regarding the current situation with regard to obstacles, restricted areas, naval pathways, shore line and other platforms in the vicinity from Situation Awareness module 16, on the COLREGS rules and on other programmed instructions. The instructions that platform control module 14 communicates to platform drive 24 may be modified from the input from Decision module 18 on the basis of the limitations of the platform, or for other reasons. For example, if Decision module 18 selects a large change in course or speed, platform control module 14 may instruct platform drive 24 to execute only a smaller change.

The instructions may be provided for a human operator to set the course and speed of the platform according to these instructions. The instructions may be provided in audio or visual form, such as for example, on a display screen, a printer for printing a printout, a speaker for providing an audio message, or other audio or video forms. Alternatively, or additionally, the instructions may be transferred to Control module 14.

Platform control module 14 may modify the instructions in response to conditions, for example wave or wind conditions, that make executing the course selected by Decision module 18 difficult to execute or non optimal in relation to the conditions or platform limitations.

Situation Awareness module 16 describes the current relative positions and velocities of obstacles and other platforms in the vicinity of the maneuverable platform. Situation Awareness module 16 receives data from sensors (such as, for example, environmental sensors 26) on one or more identifying parameters which include position, course and speed, relating to the platform and obstacles in the vicinity of the platform. By "position" is meant the absolute position of the platform and obstacles, or the relative position between them. Some of this information may be received from the remote station (10), before or during the performance of the mission. Environment sensors 26 may include radar, automatic identification system (AIS), and any other sensors that may aid in detecting and identifying obstacles and platforms. Other sensors, such as, for example, sensors indicating engine status, fuel, oil, throttle, and other drive parameters may be included in the environmental sensors.

In addition, Situation Awareness module 16 may receive data from navigation sensors 22. Navigation sensors 22 may include a Global Positioning System (GPS) receiver, an inertial measurement unit (IMU), a compass, and a speed indicator. Input from navigation sensors 22 facilitates determining the current position and course of the maneuverable platform.

In order to ascertain its own position and the positions of obstacles and other platforms in its vicinity, the autonomous navigation system may receive input from various sensors. For determining its own position, the autonomous navigation system sensors may include a Global Positioning System (GPS) receiver, an inertial measurement unit (IMU), and a compass. For determining the positions and velocities of other objects and platforms in its vicinity, the sensors may include radar, an automatic identification system (AIS) for receiving identification and navigational information from seagoing vessels or objects also equipped with MS, or any other sensors that aid in detecting and identifying objects.

On the basis of the information received from the various sources, Situation Awareness module 16 constructs a picture of the current status. The picture of the current status includes information regarding the identity, relative location, and course of each obstacle or platform in the vicinity of the maneuverable platform, as well as the relative positions of restricted zones or other areas to which constraints apply. Decision module 18 receives the status information from Situation Awareness module 16, and uses this information in the process of making navigational decisions.

An operator at remote station 10 may communicate instructions to platform control module 14 via communication link 12, such as, for example, a wireless communication link or input the instructions directly using user interface 15 (when the operator is onboard the platform). These instructions may include, for example, mission information, such as new tasks, added or changed tasks, changes to the mission in progress or a new mission, changing or adding of waypoints, information regarding new constraints or obstacles, information on the mission timetable. Instructions regarding a waypoint may include geographic coordinates, a timetable defining when to arrive at the waypoint, how closely to approach the waypoint, direction from which to approach waypoint, preferred order in which to arrive at the various waypoints, and the relative importance of the task of reaching the waypoint. Instructions may enable the autonomous navigation system to define waypoints in an autonomous manner ("launch and forget"). For example, instructions may require the maneuverable platform to seek out an object that meets predefined criteria (such as size range, speed range, type of object) and to approach it in a predefined manner. For example, a detected object whose size and speed are within predefined ranges is to be approached to within a predefined distance from a predefined direction. Instructions may also enable the autonomous navigation system to select its own route within loosely defined constraints. For example, the maneuverable platform may be instructed to patrol a defined area.

Station 10 communicates via a remote connection 12 with autonomous navigation system 21 on board maneuverable platform 20. For example, when maneuverable platform 20 is a seagoing USV, station 10 is located on shore. However, in the case of a manned platform operating in an autopilot mode, the station may be located on the maneuverable platform itself (15). By means of station 10, it is also possible to remotely control the maneuverable platform manually and in real time.

In addition, an operator at remote station 10 may enter instructions regarding constraints on the maneuver of the maneuverable platform. For example, the operator may define restricted zones, which are areas that the maneuverable platform is instructed to avoid. In the case where the maneuverable platform is a seagoing USV, such a restricted zone may include, for example, an area with shallow water or underwater obstacles, a region surrounding a fixed buoy, areas in which boat traffic is not permitted, areas of heavy boat traffic and mined areas. Instructions regarding a restricted zone may include coordinates defining the boundaries of the restricted zone and a weight factor that reflects the relative importance of avoiding the zone. Instructions may also indicate a preference for a certain route, for example, a sea lane or road, by assigning a weight that indicates the relative desirability of following that route.

According to embodiments of the present invention, instructions may be provided in advance or communicated to the maneuverable navigation system of the maneuverable platform during the performing of the mission. The instructions may include, for example, new or additional tasks, such as, for example, waypoints, a general path, and constraints on the maneuverability of the platform. The instructions may be input or communicated to the system either before or at the start of the mission, or at a later point. The instructions may be modified at any point during the mission.

Instructions may be formulated so as to enable the autonomous navigation system to define the details of its mission. For example, the instruction may define a task to patrol an area until identifying and encountering a defined object, at which time the autonomous platform is to follow that platform. As another example, the autonomous navigation system may be instructed to employ the shortest-path to a defined waypoint on the basis of known obstacles and restricted zones. The defined shortest path then is incorporated into the mission (or task) objectives as an instruction to travel along the defined path. Optimization techniques (e.g. "Fast Marching") may be used in planning of the path.

While carrying out its mission, the autonomous platform employs sensors, or information received from a remote station, to determine its own position, and to detect, and to determine the relative positions and velocities of, other platforms and objects in its vicinity (Situation Awareness). Velocity is defined by a speed, and by a direction of motion or course. "Objects" may include, for example, stationary obstacles as well as other platforms that may be in motion, all of with which collisions are to be avoided, restricted zones, naval pathways and shore lines. At predetermined intervals, the autonomous navigation system generates a set of possible actions that the autonomous platform is capable of executing. Each possible action is generally characterized by a specific course and a specific speed.

Autonomous navigation system 21 may include one or more computer processors. Autonomous navigation system 21 may be divided into several functional modules. The functional modules may be, for example, separate computer hardware components, or separate software functions that share the same hardware components.

Some main principles in the decision making process executed by Decision module 18, which is in fact a sort of a multi-objective optimization process over a discrete solution space, are outlines hereinafter.

In order to make the decision making process fast and effective discrete velocity (speed and course) values which form a set of possible actions for the autonomous platform 20 are considered. These are termed "options". Each option is a distinct combination of course and speed.

Various specific "objectives" are considered. Objectives may include, for example, favoring traveling towards waypoints, favoring traveling in planned paths, following the COLREGS rules including for example, avoiding collision, avoiding substantial speed changes, making noticeable course changes and other objectives.

For example, COLREGS require taking early and apparent action to avoid a collision with another vessel. Also, in many cases, the COLREGS require that the course of a vessel approaching another vessel be altered to starboard in order to avoid a collision. The rules also determine, under defined circumstances, which vessel is to alter its course in order to avoid a collision. When programming an autonomous navigation system on a seagoing USV, each rule may be assigned a weight in accordance with the deemed importance of that rule. In this way, the autonomous navigation system is capable of conforming to the COLREGS rules.

For other types of platforms, or for a USV in port, the traffic rules are different. An autonomous navigation system in accordance with embodiments of the present invention may be programmed with any defined traffic rules. In addition, the autonomous navigation system may be programmed to conform to one set of rules when located in one area, and another set of rules when located in another. For example, an autonomous navigation system of a USV may be programmed to conform to the COLREGS rules when at sea, and to other rules when in a port.

"Obstacles" are considered. Obstacles may include, for example, other platforms in the vicinity of the autonomous platform, precluded or forbidden zones, mined areas, physically limiting obstacles (such as, for example, shallow waters, shore lines).

Embodiments of the present invention may include an article such as a computer or processor readable medium, or a computer or processor storage medium, such as for example a memory, a disk drive, or a USB flash memory, encoding, including or storing instructions, e.g., computer-executable instructions, which when executed by a processor or controller, carry out methods disclosed herein. Embodiments of the present invention may include computer program code means adapted to perform all or parts of method steps.

Figure 2:
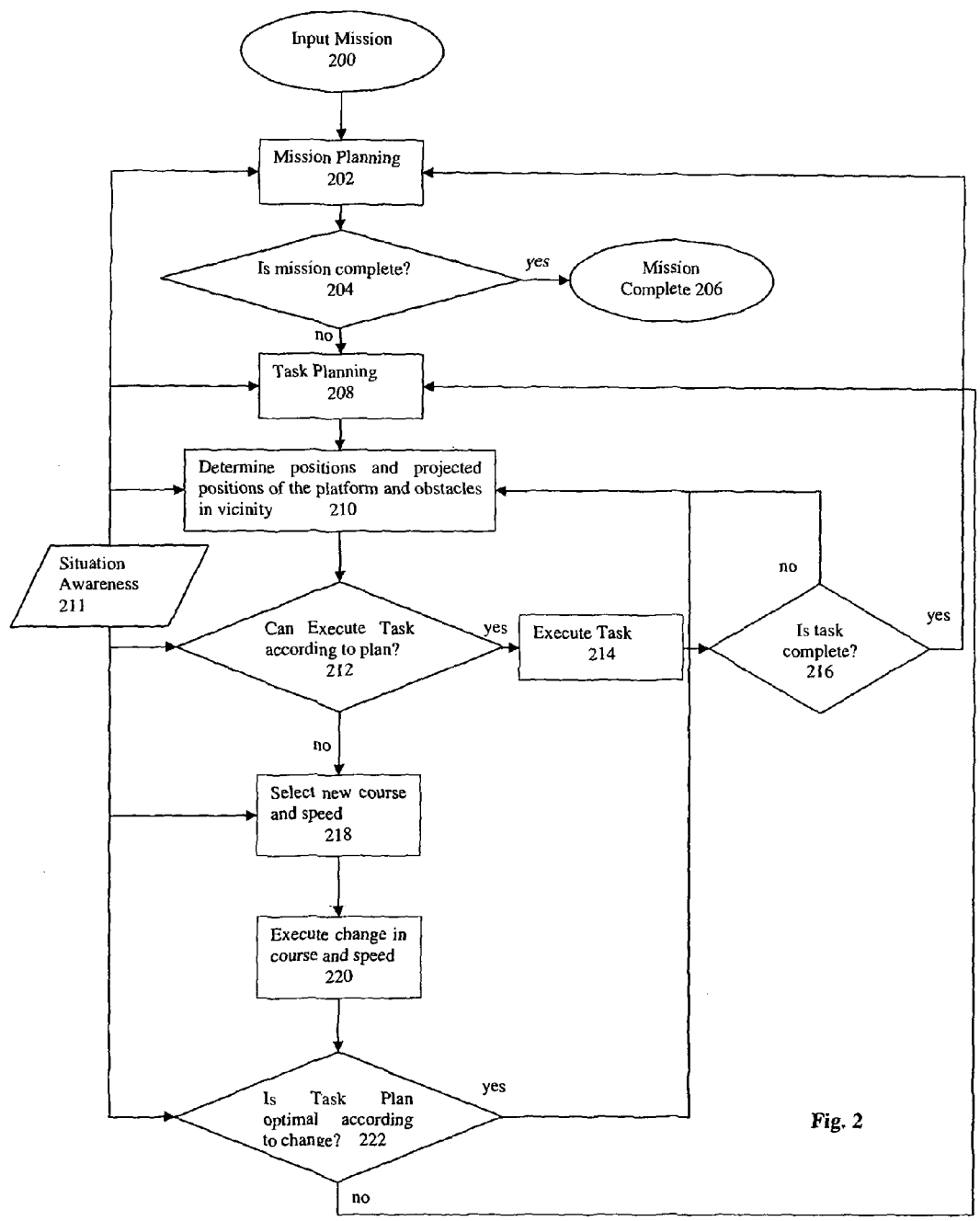
FIG. 2 illustrates a method for autonomous navigation of a maneuverable platform in accordance with embodiments of the present invention.

Reference is now made to FIG. 2, illustrating a method for autonomous navigation of a maneuverable platform in accordance with embodiments of the present invention.

The method may typically be implemented in the form of a computerized program (e.g. an algorithm) executed by the Decision module (18, see FIG. 1).

At first a mission is input (200). This can be done, for example, by entering mission information using a user interface (15 in FIG. 1), or remotely transmitting the mission information from the remote station (10 in FIG. 1). Mission information may include one or more tasks which are to be accomplished by the maneuverable platform.

The Decision module then automatically plans the mission (202). The mission plan may include determining the order in which the tasks are carried out, and setting one or more routes.

The algorithm then checks whether the mission is complete (204). If the mission is complete then a "mission complete" flag is issued (206).

If the mission is not complete, then Task Planning is performed (208) on the first task to be carried out. Task Planning may include, for example, planning the best route to the target, according to predefined criteria, or according to the given instructions with respect to that task.

The algorithm then goes on to periodically determining the position and projected positions of obstacles in the vicinity of the maneuverable platform (210). This typically may be carried out at equal intervals of time (e.g. every few minutes, every few seconds, every second and so on). The time intervals may depend on the nature of the maneuverable platforms and the obstacles, may depend on the nature of the task, may be determined by the programmer of the Decision module, or may be selected by an operator. The predetermined interval should preferably be long enough to enable acquiring and processing data from the various sensors. In addition, the predetermined interval should preferably be long enough to enable detection of any changes in position, course, or speed of the autonomous platform or of other obstacles (in particular moving obstacles) in the vicinity. On the other hand, the predetermined interval should preferably be short enough so that in the event that a change in course or speed is required, enough time is available for the autonomous platform to safely execute the change. If the interval is too long, conditions may change between iterations. For example, obstacles that were already detected may change course, and new obstacles may be detected. In the example of a seagoing USV, a predetermined interval on the order of a few seconds may be appropriate.

Then it is determined whether, based on the positions and projected positions of the obstacles, the maneuverable platform may execute its task according to plan, (212). This is described with reference to FIG. 3 in the corresponding explanation hereinafter.

If the platform may carry on executing the task (214), then it is determined whether the task is complete (216) in which case the algorithm returns to the step of mission planning (202) to start the next task. If the task is not complete then the algorithm goes back to determining the positions and projected positions of the platform and obstacles in its vicinity (210), and following the next steps.

If, however, the projected positions of the obstacles are such that the platform may not continue executing the present task according to plan, then the algorithm goes on to select new (changed) course and speed (218). This is described in FIG. 4 and the corresponding explanation hereinafter. The new course and speed are executed (220), and the task plan is examined to determine if it is still optimal (or acceptable) given the new course and speed (222). This step may be carried out occasionally and not for each iteration of the algorithm.

If the task plan remains optimal (or acceptable) then again it is determined whether the maneuverable platform may execute its task according to plan (212).

If, however, the task plan becomes unacceptable or not-optimal as a result of the new course and speed, then the step of Task Planning follows (208).

The Situation Awareness module (16 in FIG. 1) may constantly provide information on the current status (Situation Awareness 211) of the platform and obstacles in the vicinity of the platform, as well as other environmental parameters (such as, for example, wind direction and speed, temperature, visibility conditions).

Figure 3:
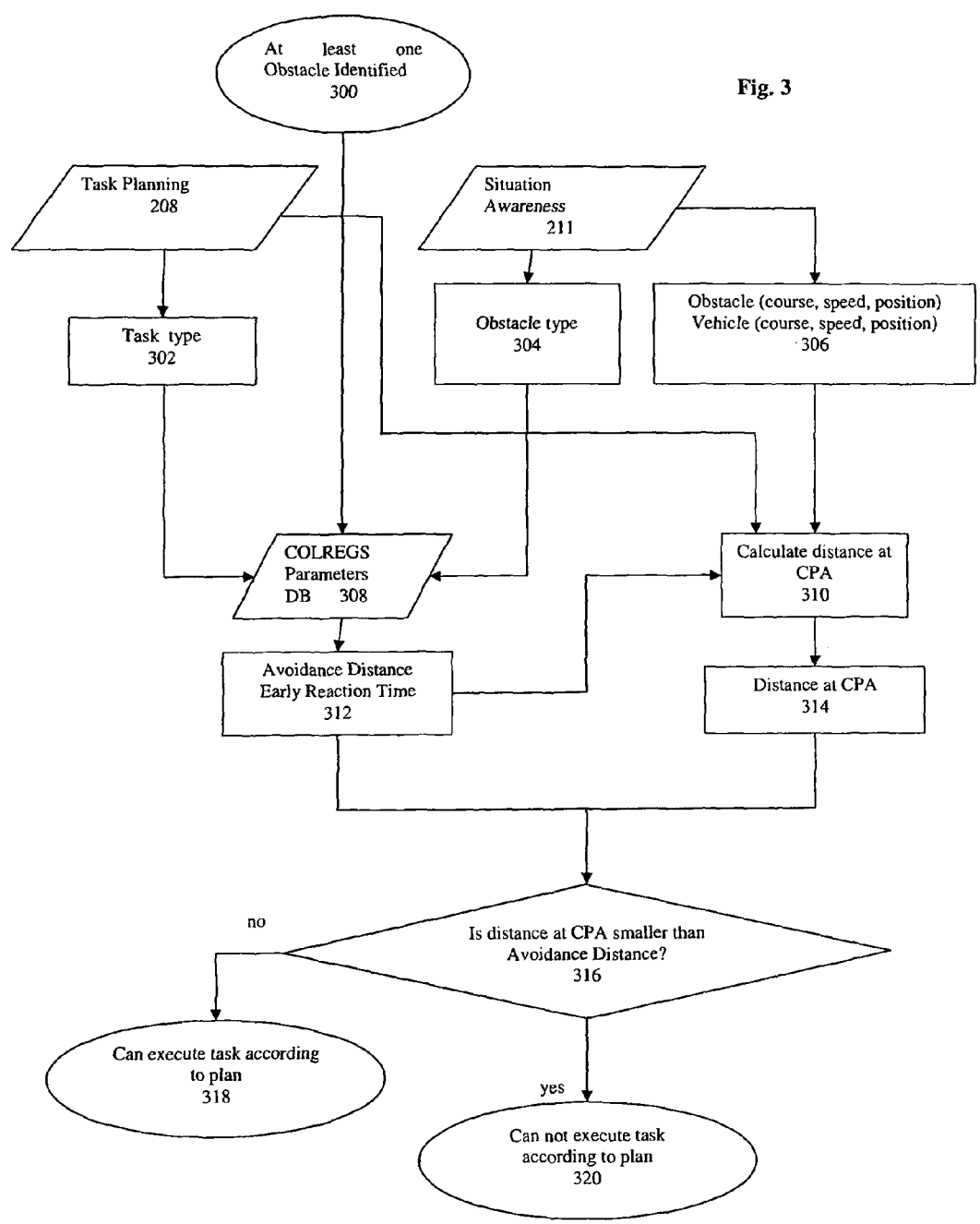
FIG. 3 is a flowchart of an algorithm for determining whether an autonomously navigated maneuverable platform can execute a task according to a predetermined plan, in accordance with embodiments of the present invention.

FIG. 3 is a flowchart of an algorithm for determining whether an autonomously navigated maneuverable platform can execute a task according to a predetermined plan, in accordance with embodiments of the present invention.

Determining whether the platform can execute the task according to plan (see 212 in FIG. 2) depends on the current position of the obstacles in the vicinity of the platform and their projected position and according to plan. The "projected position" refers to the position at which an obstacle is anticipated to be as time progresses. The projected position of a stationary obstacle is the same as its current position, whereas the projected position of a moving obstacle might be determined by extrapolating from its current position and speed, adding an uncertainty bubble which might take into account the obstacle possible maneuvers. The projected position of the maneuverable platform may depend on the route planned by the Task Planning module 208.

When at least one obstacle is identified (300) the following procedure may be carried out with respect to each of the identified obstacles. Depending on the type of the task (302)—information which is provided from the Task Planning (208), and depending on the obstacle type (304), retrieved from the Situation Awareness (211), an algorithm which may be run by the Decision module considers a database of COLREGS parameters (308) to determine the avoidance distance and early reaction time (312).

The "avoidance distance" is the minimal distance for the platform to keep away from an obstacle in order to prevent collision. The "avoidance distance" may relate, for example, to the type of the obstacle and the type of the task. The "early reaction time" is the minimal reaction time needed before the anticipated moment in time in which the platform and the obstacle are too close, so as to allow sufficient room for safe passage of the other platform or sufficient room to maneuver safely.

The type of the task is important in determining the avoidance distance and early reaction time. For example, in a case of a task that includes following an obstacle, where it is important that the obstacle will not detect it is being followed, it may be desired to keep the platform at a greater distance from the obstacle than is otherwise required for other reasons (such as, for example, collision avoidance). The type of obstacle is also important as the avoidance distance and early reaction time would be different for obstacles of different maneuverability. A cargo vessel would react differently from a light speed boat (when considering maritime tasks), as would a light airplane react differently from a passenger airliner (when considering aerial tasks).

Given the positions, courses and speeds of the obstacle (306) which are provided from the Situation Awareness (211), and the task plan (302), the estimated time, shorter than the early reaction time, to reach the closest point of approach (CPA), and the distance between the platforms at this time are determined (310). The avoidance distance and the calculated distance at the CPA (314) are considered and it is determined whether the distance at CPA, within the early reaction time, would be smaller than the avoidance distance (316).

If the distance at CPA is smaller than the avoidance distance then it is determined that the platform cannot continue to execute its task according to plan (320). Otherwise it is determined that the platform may continue executing its task according to plan (318). If it is determined that the platform cannot continue to execute its task according to plan in regard to at least one obstacle, the flag of 212 is set to 'no'.

When determining a new course and speed for the platform a weighted "grade" is calculated for each option in a manner which is described hereinafter, and a preferred option is selected accordingly. The weighted grade of an option is indicative of the desirability of that option with respect to the considered obstacles and objectives.

The grade of an option is a sum of all the grades calculated for that particular option with respect to all objectives and obstacles. In order to find the preferred option a three dimensional matrix of grades may be generated, where each element of the matrix is a grade relating to particular option, objective and obstacle.

A grade in the three dimensional matrix may indicate the desirability of the associated option or the level of risk involved in performing this option, with respect to an obstacle and a given objective.

In the context of a USV, objectives may include, for example, performing the task according to plan, conformance with various traffic rules (e.g. COLREGS rules), avoidance of collisions with various obstacles, maintaining a speed within a predefined range, avoiding substantial speed changes and making a noticeable course change when maneuvering to avoid collision with another sea-going vessel. Of course, other objectives may be defined too.

With regard to avoidance of collisions with an obstacle in the vicinity of the platform, the grading function may relate to the point in time and the distance between the maneuverable platform and the obstacle at the CPA (closest point of approach) Possible options may be graded with regard to the objective of maneuvering in early reaction time to avoid a projected collision with the obstacle. For example, a grade that indicates the urgency of avoiding a collision with an obstacle may be assigned based on a function of the predicted time and distance to the projected collision versus the early reaction time and the avoidance distance respectively (such as an inverse squared function).

Each option is graded with respect to each obstacle and with respect to each objective.

The objectives may be each assigned weights. Whereas the grading functions would typically be defined and embedded in the system by the system programmers, weights would typically be assigned to each objective by the mission supervisor. Typically the weights would be different for varied mission types. For example, for the confidential mission of following or approaching an object, the objective of following the COLREGS rules may be assigned a smaller weight than the same objective for the mission of patrolling a predefined area. The weights would typically be assigned before the mission commences, yet may possibly be changed as the mission progresses.

The mission supervisor may regard certain objectives as more important for a specific mission than other objectives, and indicate their level of importance by assigning them weights that represent their level of importance as the mission supervisor sees it. Different missions may require the mission planner to assign objectives with weights differently.

For example, the mission supervisor may find the objective of collision avoidance much more important that maintaining a speed within an allowed range, or avoiding speed changes, and assign weights that reflect that. The grading function for each objective too may be designed so that for one objective the range of grades varies for example between −100 to 100, whereas for a different objective the range would be between −10,000 to 100, resulting in greater influence of a "bad" grade for the latter objective than a negative grade for the previous objective. It is noted that typically a different grading function would be assigned to different objectives.

Once grades have been calculated for each possible option, with respect to each obstacle and each objective, the autonomous navigation system selects the option whose grade indicates that it is the most desirable action with respect to all obstacles and objectives from among the generated set of possible options. For example, in a system where a more desirable option is assigned a grade with a greater positive value than that grade value assigned to a less desirable option, the option with the maximum assigned grade is selected. The selected option is then executed by the autonomous platform.

The way a weighted grade for each option is calculated is explained with reference to FIG. 4.

Figure 4:
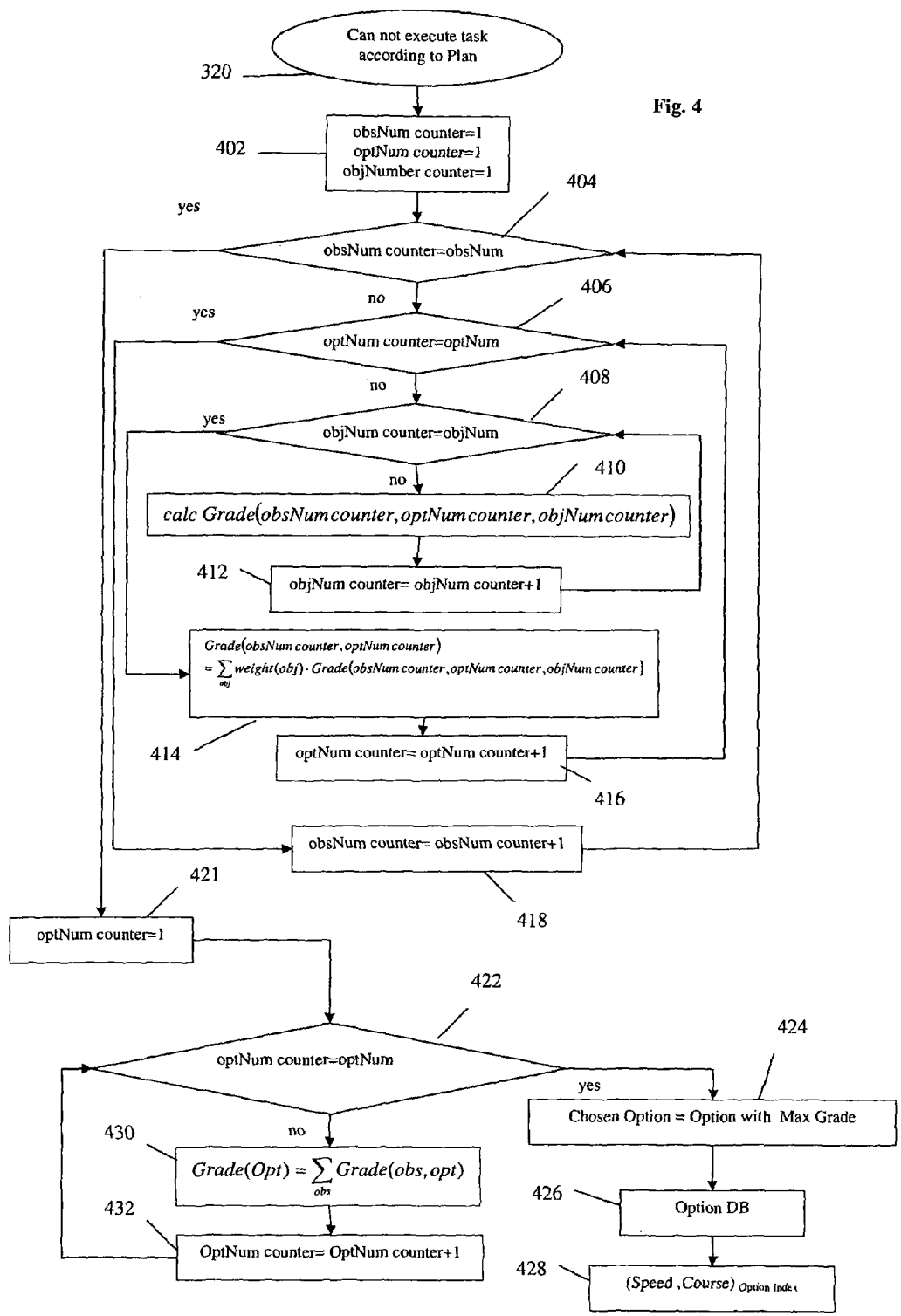
FIG. 4 is a flow chart of an algorithm for selecting preferable course and speed of an autonomously navigated maneuverable platform in accordance with embodiments of the present invention.

FIG. 4 is a flow chart of an optional algorithm for selecting preferable course and speed of an autonomously navigated maneuverable platform in accordance with embodiments of the present invention.

A grade is calculated for all possible combinations of obstacles, options and objectives. This may be carried out, for example, by using for-loops, as demonstrated in FIG. 4, where at first counters for the obstacles (obsNum being the number of obstacles in the vicinity of the platform), options (optNum being the number of options considered) and objectives (objNum being the number of objectives defined) are reset to 1 (402). ObsNum counter (404), optNum counter (406) and objNum counter (408) are each advanced at their turn in the loops (412, 416 and 418 respectively), and grade function (410) is used in calculating a grade for each obstacle, with respect to each option and each objective. The weights are taken into account (414) for each objective.

Then OptNum counter is reset to 1 (421) and a grade for each option is calculated, using a loop (between 421 and 432) to sum up all grades for that options with respect to all obstacles (430). When all option grades are calculated, the chosen option is determined to be the option whose grade is maximal (424). The parameters for that chosen option (e.g. course and speed) are extracted (from option database 426), and the chosen course and speed (428) are presented.

A grade function per each option, objective and obstacle is typically predefined by the algorithm programmer, whereas a "weight" for each objective is typically assigned by the mission supervisor, either before the mission commences, possibly changing it during as the mission progresses.

In order to optimize the calculation, various objectives, or classes of objectives, may be treated in various manners. For example, an option whose performance would lead to a collision that must be avoided at all cost may be assigned a highly negative grade, regardless of the desirability of that option with regard to other objectives. As another example, an option may be eliminated from consideration on the basis of the change in course or speed that the option entails. For example, small changes that are not noticeable by other platforms may be eliminated from consideration, while large changes may be unattainable by the platform. Alternatively, it may be wise not to eliminate options so as to allow choosing an option when all options are bad.

Figure 5:
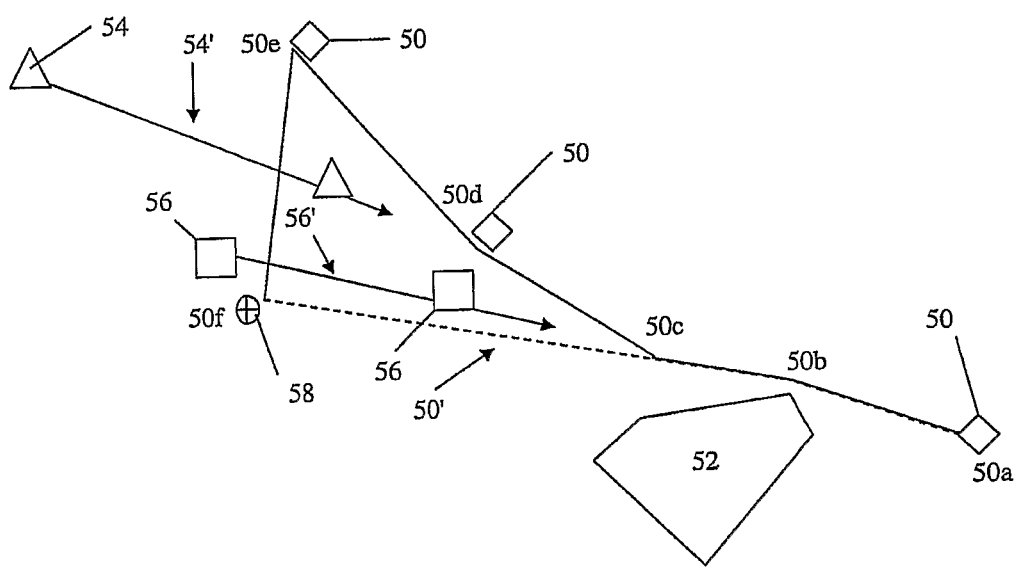
FIG. 5 illustrates an example of behavior of a maneuverable platform with an autonomous navigation system, in accordance with embodiments of the present invention.

FIG. 5 illustrates an example of behavior of an autonomous navigation platform in accordance with embodiments of the present invention.

Maneuverable platform with an autonomous navigation system 50 (indicated by the diamond symbol), located at point 50a, is assigned a mission that includes a task of reaching to way point 58. A planned pathway (indicated by dotted line 50') is determined at the Task Planning stage (see 208 in FIG. 2), taking into account restricted zone 52. The far presence of moving obstacles 54 (indicated by the triangle symbol) and 56 (square)—traveling along pathways 54' and 56' respectively—does not at that time affect the planned pathway, since the obstacles are very far.

Platform 50 travels from point 50a to point 50b, and then to point 50c. At that point the environmental sensors (26, see FIG. 1) of the autonomous navigation system onboard platform 50 cannot ignore the presence (location, course and speed) of approaching obstacle 56, which appear to be crossing the planned pathway in a collision course towards platform 50, and the autonomous navigation system selects to perform a change in the course (and perhaps the speed) of the platform towards point 50d, at which the presence (location, course and speed) of approaching platform 54 dictates another change in the course (and possibly speed) of platform 50 towards point 50e. upon reaching point 50e it is determined that both obstacles 54 and 56 are headed away and platform 50 heads now directly towards point 50f, which is where waypoint 58 is located.

Figure 6:
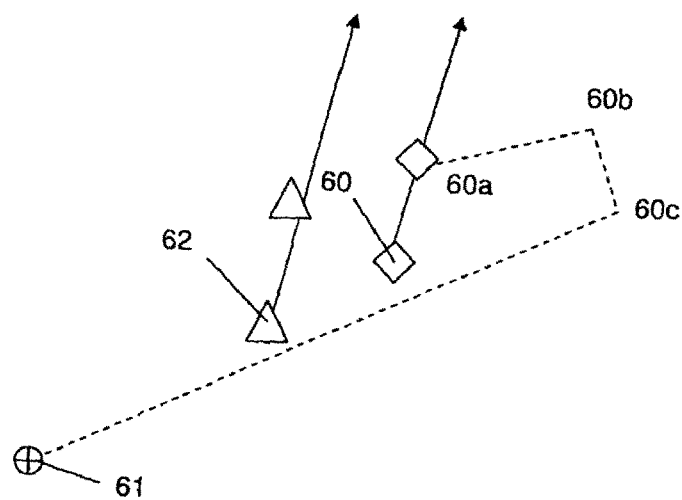
FIG. 6 illustrates a situation where, in accordance with embodiments of the present invention, the autonomous navigation system is forced to stop continuing to choose local optimum options which cause the platform to head away from its destination and prevent it from accomplishing its designated task.

FIG. 6 illustrates a situation where, in accordance with embodiments of the present invention, the autonomous navigation system is forced to stop continuing to choose local optimal solutions which cause the platform to head away from its destination and prevent it from accomplishing its designated task.

Maneuverable platform with an autonomous navigation system 60 is assigned a task of reaching waypoint 61. Obstacle 62 is moving at the same course and speed as the maneuverable platform, preventing it from maneuvering straight to 61. In order to reach 61, the maneuverable platform should make a detour, e.g. follow the dashed route to 60b, 60c and then to 61.

Platform 60 may find itself repeatedly choosing options that would cause it to move at the same speed and course, thus effectively increase its distance from the target waypoint 61 instead of approaching it.

A local optimal option is the option that appears locally to be the best course of action to take. Yet, in particular scenarios, choosing the best option at each iteration might not lead to a general solution that would allow successful completion of the task, because the distance between the platform and the target waypoint increases in each iteration.

It may be desired, at such instances, to choose an option that is graded less than the highest graded option, in order to allow for the completion of the task, yet the option selection algorithm as it was described hereinabove is designed to always select the highest graded option. This is typically associated with the existence of moving obstacles, as when only stationary objects are present, route planning algorithms such as Fast Marching are proven to yield a globally optimal solution.

One way to deal with this problem would be to take into account more future steps, but this would lead a sharp increase in the number of options to consider, possibly beyond the calculation power of the Decision module of the autonomous navigation system. More then that, the moving obstacles may change their course and speed, causing the prior calculated solution to become obsolete.

In order to ensure that the maneuverable platform with an autonomous navigation system, according to embodiments of the present invention, accomplishes its task, it is suggested to track its behavior over time to determine if for a given period of time the platform chooses options that increase its distance from the target. If this is so, than a perturbation in the solution space (the set of available options) is carried out during a few iterations, forcing the autonomous navigation system to choose an option that is not the local optimum option. It is assumed that after a while relative positions of the platform and the moving obstacle would probably change no longer preventing the platform from then returning to selecting options that would eventually lead it to its target.

Alternatively, upon detecting a situation of local optimum options that prevent the platform from accomplishing its task, the task may be replanned, for example by employing a pathway planning algorithm, such as for example, fast marching, Dijkstra, A*, while considering the moving obstacle to be a large stationary obstacle stretching in the direction of approach of the obstacle.

In most cases, the option selection algorithm as described hereinabove may lead to a sub-optimal solution without impeding the mission completion, as typically the moving obstacle would be past and clear after a short while, letting the maneuverable platform to plan a new shortest route to the target (222 and 208 in FIG. 1).

Thus, according to embodiments of the present invention an autonomous navigation system for an autonomous platform is provided that utilizes an algorithm that is robust, may be accommodated to a large number of platform types and situations, effectively handles situations where a large number of obstacles and other platforms are present, and effectively handles situations governed by a large number of rules, some of which are ill-defined and contradictory.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A method comprising:
   obtaining a plurality of objectives relating to a maneuverable platform, wherein the objectives comprise mission related and non-mission related objectives and wherein the objectives are weighted in accordance with a grading scheme;
   receiving platform and obstacles data relating to at least one of: position, speed, and direction of said platform and of obstacles;
   determining a plurality of options of direction and speed for the platform;
   obtaining a plan for said at least one task defining the mission related objectives;
   autonomously selecting, one option of the plurality of options, in order to achieve said objectives, by calculating a weighted grade of each option based on the weights of the objectives and said grading scheme; and
   periodically repeating: (a) the receiving with updated platform and obstacles data and (b) the autonomously selecting with the updated platform and obstacles data, wherein the autonomously selecting is executed by a computer processor and includes determining whether said at least one task cannot be accomplished according to plan before selecting the preferred option, which includes, for each obstacle, calculating projected positions of the platform and of that obstacle to determine the distance between the platform and the obstacle at the closest point of approach and estimated time to arrive to the closest point of approach, and determining, with respect to an early reaction time and an avoidance distance suitable for that obstacle and the platform, whether that distance is smaller or greater than the avoidance distance.

2. The method according to claim 1, wherein the repeating further comprising at least one of: the obtaining and the determining.

3. The method according to claim 1, wherein the grading scheme is generated so that at least some objectives are graded, for at least part of the time so that other objectives are neglected in the autonomous selection stage.

4. The method according to claim 1, further comprising maneuvering the platform and commanding drive controls of the platform to apply the autonomously selected direction and speed of the option for the platform.

5. The method according to claim 1, wherein said objectives are selected from a group of objectives including: conforming to traffic rules, avoiding collisions with other obstacles, maintaining a speed within a predefined range, avoiding substantial speed changes, avoiding substantial direction changes, making a noticeable direction change, performing the task according to plan and fulfilling the task.

6. A system comprising:
   a situation awareness module configured to receive platform and obstacles data relating to at least one of: position, speed, and direction of said platform and of obstacles; and
   a decision module configured to:
   (a) obtain a plurality of objectives relating to a maneuverable platform, wherein the objectives comprise mission related and non-mission related objectives and wherein the objectives are weighted in accordance with a grading scheme;
   (b) obtain a plan for said at least one task defining the mission related objectives;
   (c) determine a plurality of options of direction and speed for the platform;
   (d) autonomously select, one option of the plurality of options, in order to achieve said objectives, by calculating a weighted grade of each option based on the weights of the objectives and said grading scheme; and
   (e) determine whether said at least one task cannot be accomplished according to plan before selecting the preferred option, which includes, for each obstacle, calculating projected positions of the platform and of that obstacle to determine the distance between the platform and the obstacle at the closest point of approach and estimated time to arrive to the closest point of approach, and determining, with respect to an early reaction time and an avoidance distance suitable for that obstacle and the platform, whether that distance is smaller or greater than the avoidance distance;
   periodically repeat: (i) the receiving with updated platform and obstacles data and (ii) the autonomously selecting with the updated platform and obstacles data.

7. The system according to claim 6, wherein the repeating further comprising at least one of: the obtaining and the determining.

8. The system according to claim 6, wherein the grading scheme is generated so that at least some objectives are graded, for at least part of the time so that other objectives are neglected in the autonomous selection stage.

9. The system according to claim 6, further comprising maneuvering the platform and commanding drive controls of the platform to apply the autonomously selected direction and speed of the option for the platform.

10. The system according to claim 6, wherein said objectives are selected from a group of objectives including: conforming to traffic rules, avoiding collisions with other obstacles, maintaining a speed within a predefined range, avoiding substantial speed changes, avoiding substantial direction changes, making a noticeable direction change, performing the task according to plan and fulfilling the task.

* * * * *